June 2, 1931.      A. C. LEE      1,807,695
WEED EXTERMINATOR
Filed Sept. 25, 1929
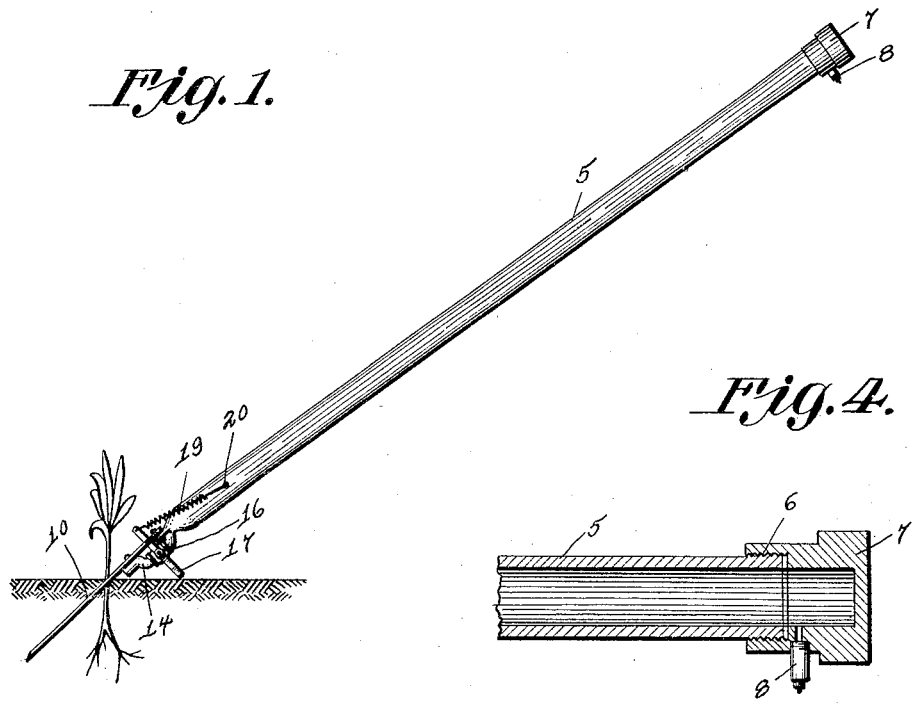
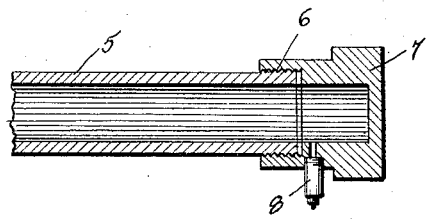
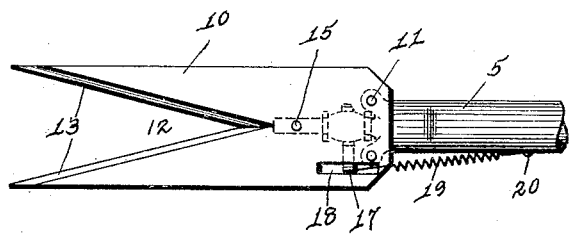
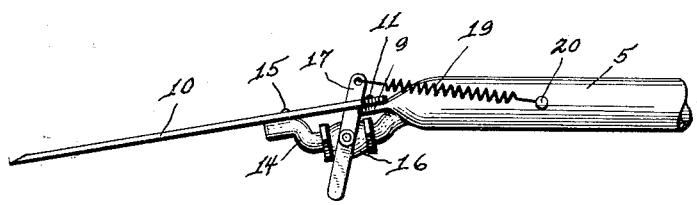

Patented June 2, 1931

1,807,695

UNITED STATES PATENT OFFICE

AMUND C. LEE, OF VIROQUA, WISCONSIN

WEED EXTERMINATOR

Application filed September 25, 1929. Serial No. 395,062.

My invention relates to improvements in garden tools and has for its object to provide a tool for cutting weeds and simultaneously discharging a poison liquid onto the roots, to kill the same.

A further object of the invention is to provide a tool of the above-mentioned character having means for automatically discharging the poison liquid at the time the weed is cut.

Another object of the invention is to provide a tool of the above-mentioned character which is simple and durable in construction, reliable and efficient in use and inexpensive to manufacture.

Other objects and advantages of the invention will be apparent during the course of the following description.

In the accompanying drawings, forming a part of this specification and in which like numerals are employed to designate like parts throughout the same, Fig. 1 is a side elevation view of the tool in operative position, Fig. 2 is a top plan view of the blade, Fig. 3 is a side elevation view of the blade and lower end of the handle, and, Fig. 4 is a longitudinal sectional view of the upper end of the handle.

In the drawings, wherein for the purpose of illustration, I have shown a preferred embodiment of my invention, the numeral 5, denotes a tubular handle having screw-threads 6 at its upper end to receive the removable cap 7, through the side of which is mounted a conventional type of air valve 8. The lower end of the handle is provided with ears 9, to which the upper end of the blade 10 is attached by means of rivets 11. The blade is formed from a flat sheet of metal having a relatively deep V-shaped slot 12 in its lower edge, the sides of which are sharpened to provide cutting edges 13.

Extending from the lower end of the handle is a discharge pipe 14 which extends beneath the blade 10 having its forward end disposed adjacent the apex of the slot 12 and fixedly connected to the blade by the rivet 15. A conventional type of globe valve 16 is interposed in the discharge pipe 14 having an operating lever 17 connected to the side thereof. One end of the lever 17 extends below the valve and is adapted to engage with the ground when the blade is inserted in the ground, thereby opening the valve and permitting the poison liquid within the handle to be discharged. The opposite end of the lever 17 extends upwardly through the slot 18 in the blade and is connected to one end of the coil spring 19, which has its opposite end connected with the handle, as at 20, whereby the valve is automatically closed when the blade is withdrawn from the ground.

In use, the tubular handle is partially filled with a suitable poison liquid and air is then injected into the handle through the valve 8 by means of an air pump. The tool is then ready for use and when the blade is inserted into the ground to cut the weed, the lever 17 will contact with the ground opening the valve 16 and permitting the poison liquid to be discharged upon the root of the weed, killing the same. Upon withdrawal of the blade the valve 16 will be automatically closed by the spring 19.

It is to be understood that the form of my invention herewith shown and described is to be taken as a preferred example of the same and that certain changes in the shape, size and arrangement of the parts may be made without departing from the spirit of the invention or the scope of the subjoined claim.

Having thus described my invention, I claim:—

A tool of the character described comprising a tubular handle, a blade connected to the lower end of said handle having a V-shaped slot in its lower edge providing cutting edges and also having a slotted opening in its upper portion, a discharge pipe extending from the lower end of the handle beneath the blade, a valve mounted in said discharge pipe, a lever connected with said valve having one end disposed for engagement with the ground to open said valve and with its opposite end inserted through the slotted opening of the blade to limit the opening and closing movement of the lever, and a spring connected to the inserted end of said lever, for automatically closing said valve.

In testimony whereof I affix my signature.

AMUND C. LEE.